United States Patent [19]
Smith

[11] 3,938,774
[45] Feb. 17, 1976

[54] METHOD AND APPARATUS FOR SEALING LEAKING PIPELINE JOINTS

[75] Inventor: Edward Peter Smith, Burton-Upon-Trent, England

[73] Assignee: BTR Industries Limited, England

[22] Filed: May 23, 1974

[21] Appl. No.: 472,820

[30] Foreign Application Priority Data
July 2, 1973 United Kingdom............... 31492/73

[52] U.S. Cl. ................. 249/90; 264/261; 264/263
[51] Int. Cl.² ..................... B22D 19/04; B23P 7/00
[58] Field of Search .......... 249/84, 89, 96, 98, 164, 249/144, 145, 90; 138/97; 285/15; 264/32, 36, 262, 263, 261

[56] References Cited
UNITED STATES PATENTS

| 881,665 | 3/1908 | Corcoran | 249/137 X |
| 2,180,810 | 11/1939 | Keegan | 249/89 |
| 2,785,450 | 3/1957 | Willett | 249/89 |
| 2,832,111 | 4/1958 | Thomas | 249/89 |
| 3,368,005 | 2/1968 | Buczala | 285/15 X |
| 3,467,141 | 9/1969 | Smith | 138/97 |

FOREIGN PATENTS OR APPLICATIONS
360,146  11/1931  United Kingdom............... 249/89

Primary Examiner—Francis S. Husar
Assistant Examiner—John S. Brown
Attorney, Agent, or Firm—Watson, Cole, Grindle & Watson

[57] ABSTRACT

A leaking joint in a pipeline is sealed by locating a separable mould around the joint to form in conjunction with the pipeline a mould chamber enclosing the joint. Sealant is injected into the mould chamber and the volume of the mould chamber is reduced by deforming a flexible wall of the chamber to pressurize the sealant to a pressure above that inside the pipeline until the sealant has solidified around the joint.

8 Claims, 4 Drawing Figures

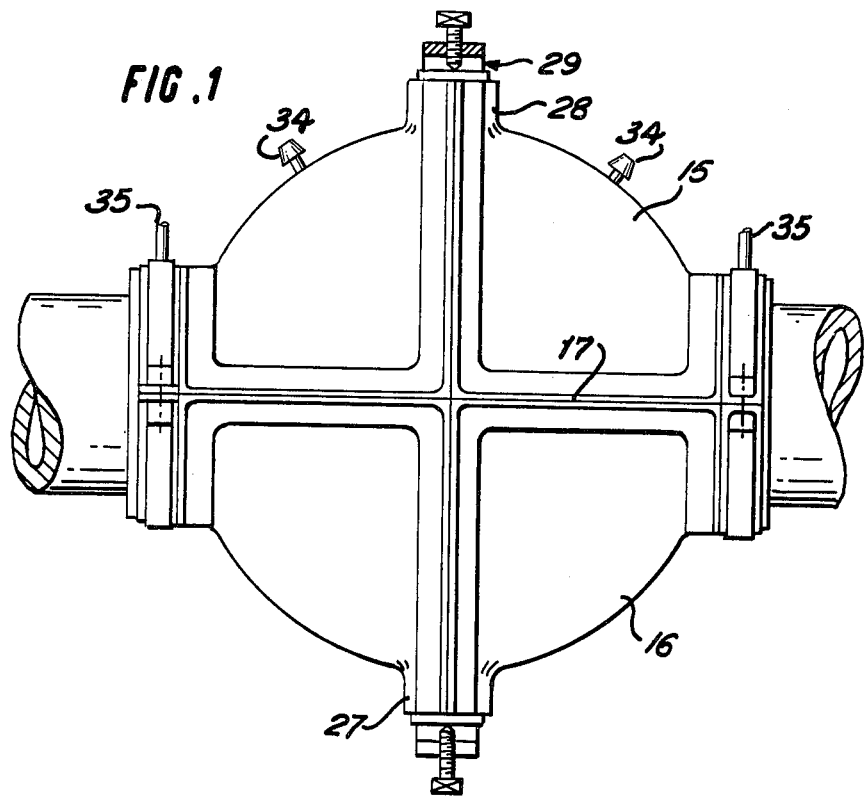
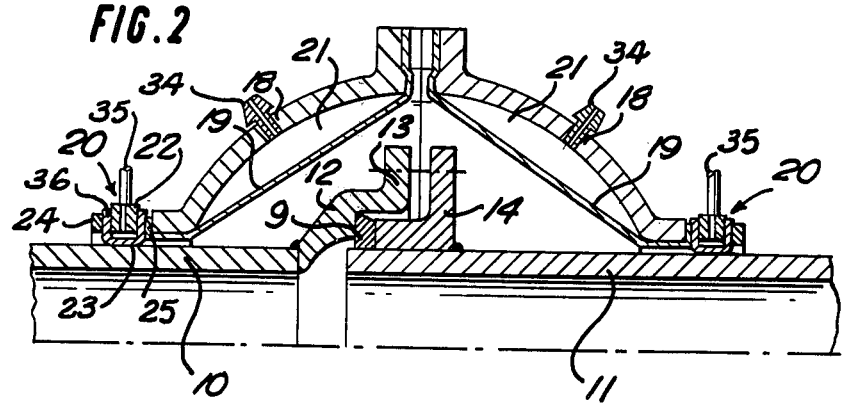

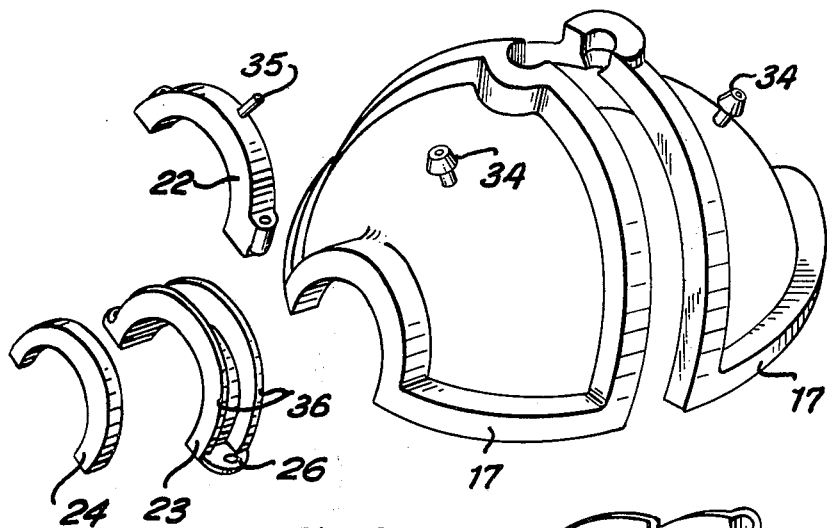
FIG. 3
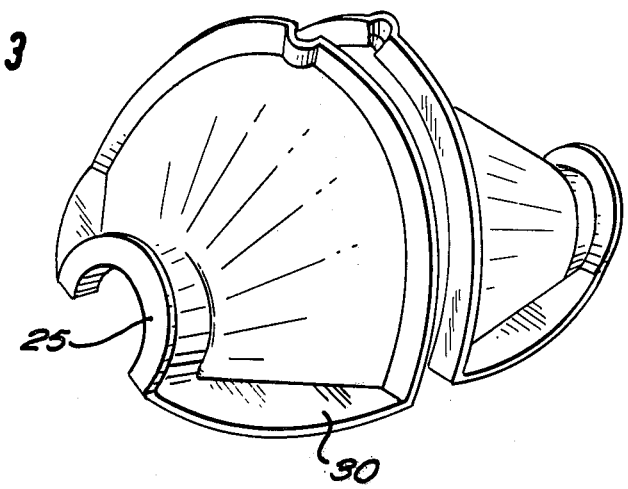
FIG. 4
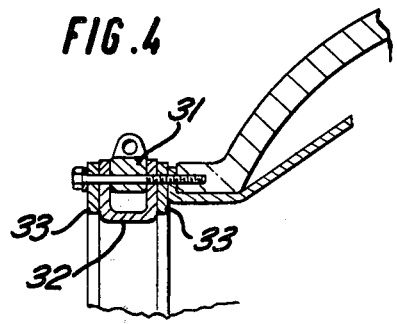

METHOD AND APPARATUS FOR SEALING LEAKING PIPELINE JOINTS

BACKGROUND OF THE INVENTION

The invention relates to a method and apparatus for sealing a leaking joint in a pipeline.

It is already known to provide moulds made of flexible or rigid material which are located around a joint in a pipeline and are sealed to the circumference of a pipeline on each side of the joint by using straps compressing the flexible material to the pipe surface in the first case or by using rubber seals pressed against the pipe surface by the rigid moulds when they are clamped around the joint in the latter case. Sealant is injected into the mould so that it fills the moulds and is at a pressure above the pressure within the pipeline. With both flexible and rigid moulds the pressure is maintained on the sealant during hardening by virtue of strain energy in the mould material which results because the sealant is injected at a pressure to produce a certain expansion of the mould, and the inlet is immediately shut off to maintain the pressure during hardening. However, a disadvantage of this method of sealing is that only a small leakage of sealant can be tolerated before the pressure on the sealant drops below the pressure within the pipeline and gas starts to leak. Furthermore, since there is a discontinuity of the flexible seals on each side of the mould chamber to allow them to fit around pipes and compression of the flexible material against the pipes by the bonds or the mould parts when clamped together is relied upon to force the seal ends together. This is unreliable and sealant is liable to leak out. Also such seals are often ineffective when undersize or badly pitted pipes are encountered.

The object of the invention is to provide a method and apparatus for sealing leaking joints in pipelines which gives an improved performance over the above described prior art moulds.

SUMMARY OF THE INVENTION

The invention provides a method of sealing a leaking joint in a pipeline, which method comprises locating a mould around the joint to provide a mould chamber enclosing the joint, injecting a sealant into the mould chamber, and reducing the volume of the mould chamber to pressurize the sealant to a pressure above the pressure within the pipeline until the sealant has solidified around the joint.

The invention also provides a method of sealing a leaking joint in a pipeline, which method comprises a separable mould which can be located around, and sealed to, a pipeline to provide in conjunction therewith a mould chamber enclosing a joint in the pipeline, and means to reduce the volume of the mould chamber to pressurize sealant injected into the mould chamber when the mould is located around a pipeline joint.

The mould may have a flexible wall which can be deformed inwardly of the mould chamber.

The advantages of using a method and apparatus according to the invention are that a saving in sealant material for each joint is achieved by effecting pressurization of the sealant by reducing the volume of the mould chamber, and a single mould can be used to seal different joint designs without using an excessive volume of sealant. Furthermore, leakage from the mould chamber will not reduce the pressure of the sealant since a constant pressure is applied to the flexible wall of the mould chamber while the sealant is hardening.

According to a feature of the invention, sealing means are provided on the mould to seal the mould to the pipeline on each side of the joint. The sealing means may comprise resilient sealing members on the parts of the separable mould, which members co-operate when the mould parts are fitted together to provide sealing rings one on each side of the mould chamber. The sealing members may be U-shaped in cross-section with the limbs of the U projecting radially outwardly from the base of the U, a rigid element being located between the free ends of the limbs of each member to define a space between the sealing member and the rigid element, and means being provided to connect that space to a source of fluid pressure. The sealing means may be releasably secured to the mould.

The provision of inflatable seals which are releasably secured to the mould gives the further advantages that a single mould can be used for sealing a range of pipe diameters merely by changing the end seals, again without using an excessive amount of sealant. For example if the smallest pipe diameter accommodated by a mould according to the invention is D, the mould can also seal pipes having a diameter up to 1½ D. Also leakage from the inflatable end seals is less likely than with the prior art constructions especially when undersize or badly pitted pipes are encountered.

BRIEF DESCRIPTION OF THE DRAWINGS

FIG. 1 shows a side view of a mould embodying the invention and positioned around a pipeline joint;

FIG. 2 shows a section through the upper portion of the mould and pipeline joint of FIG. 1;

FIG. 3 shows an exploded view of the upper half of the mould of FIG. 1; and

FIG. 4 shows a scrap section of another mould embodying the invention.

DETAILED DESCRIPTION

Referring to FIGS. 1 to 3 of the drawing, there is shown a pipeline joint between adjacent ends of two pipes 10 and 11. The joint comprises a joggled end portion 12 on the pipe 10, the free end of which is provided with an outwardly extending flange 13. An L-section gland ring 14 is located around the pipe 11 at a short distance from its end. The end of pipe 11 engages within the joggle portion 12 and a sealing ring 9 is located therebetween. The joint is made by bolting together the flange 13 and the outwardly directed portion of the ring 14.

During use of a pipeline for conveying gas at pressures substantially above atmospheric, the sealed joints therein, such as the one shown in the drawing, may begin to leak due to shrinkage or stress relaxation in the flexible sealing ring and it has been found generally to be unsatisfactory or impossible to remake the seal by tightening the bolts on the gland ring.

According to the embodiment of the invention shown in the drawings, such leaking pipeline joints are sealed by using an encapsulation mould comprising an upper half 15 and lower half 16 which are placed around the joint to be encapsulated and are bolted or otherwise joined at integral flanges 17. Each mould half comprises two main shells 18, made in a suitable light material such as aluminium, bonded, or otherwise secured to elastomeric forming liners 19 and equipped with end seals 20. The elastomeric liners 19 are in the form of truncated cone halves equipped with flanges on all edges which flanges are bonded or otherwise secured to mating flanges on the main shells 18 so that pressure tight chambers 21 are formed when the mould is assembled.

The end seals 20 comprise a semi-circular metallic outer member, 22, a semicircular elastomeric sealing member 23 of U-shaped cross-section within the member 22 with flanges 36 formed by the limbs of the U-shaped cross-section which embraces the member 22, and a semicircular locking plate 24. The assembled seals are shown in FIG. 2. One of the limbs of the elastomeric sealing member 23 is trapped between the locking plate 24 and a side face of the outer member 22. The other limb of the sealing member 23 is trapped between the other side face of the outer member 22 and a flange 25 on one of the liners 19 when the end seal is attached to the mould half by a suitable number of bolts. The sealing member 23 is equipped with flanges 26 which are trapped between the ends of the outer member 22 and the mating lower sealing member when the mould is assembled on the pipe joint.

Air or other pressurising fluid can be admitted through connectors 35 into the space enclosed between the outer members 22 and the sealing members 23 and all four such members are connected to a common source of pressurised fluid after the mould is assembled on the joint. This has the effect of deforming the bases of the U-Shaped cross-sectioned sealing members 23 radially inwardly so that they seal tightly against the pipe surfaces and prevent the egress of gas or sealant.

Similarly air or other pressurising fluid, at a pressure less than that in the end seals, can be admitted into the chambers 21 via connectors 34 in the outer shells 18 which are suitably inter-connected to maintain equal pressure inside them.

A passage 27 is provided in the bottom half of the mould to enable the sealant material to be admitted to the cavity formed by the forming liners 19, the end seals 20 and the pipe and joint surfaces. A valve is provided to shut off the passage 27 when necessary. A similar passage 28 equipped with a bleed valve 29 is provided in the top half of the mould to enable gas and excess sealant to be evacuated from the cavity.

In use the two mould halves are bolted together around a pipe joint which is to be sealed, the surfaces of the pipes adjacent the joint and the gland rings having first been cleaned by grit blasting or other suitable means. The valve 29 on the top half of the mould is open at this stage and air or other suitable fluid is admitted to the end seals 20 at a pressure considerably in excess of the pressure of the gas in the pipeline so that the elastomeric members 23 of the end seals 20 are forced against the pipe surface forming complete circumferential seals. If the pipe joint is leaking at a considerable rate the bleed valve 29 is kept open until gas has displaced the air within the mould cavity so that air cannot be forced into the pipeline during subsequent pressurisation. The valve is then shut off and the liquid sealant resin is pumped in through the passage 27 in the bottom half of the mould at a pressure in excess of the pressure in gas in the pipeline.

The sealant may be any suitable thermo-setting resin such as polyurethane, epoxide or polyester or may be a thermo-plastic material heated to a liquid or semi-liquid state and may contain bulk fillers and reinforcing agents.

After sufficient sealant has been injected the valve in the passage 27 is shut off and air or other pressuring fluid is admitted to the four chambers 21 at a pressure greater than that of the gas in the pipeline but not greater than that in the end seals 20. This has the effect of deflecting the elastomeric liners 19 towards the axis of the pipeline. The bleed valve 29 is opened to allow air or gas above the sealant to escape and is closed again when sealant starts to exude through it.

Because the elastomeric liners 19 are fixed to the main shells at the vertical equator, the liners are prevented from folding as they are forced inwards and they therefore confine the sealant in fillets around the pipe joint in areas of possible gas leakage. On the horizontal parting line of the mould, the liners 19 are joined to the flanges of the main shells by flanges 30 of the same elastomeric material which flanges 30 are bonded only on their outer edges to the flanges of the main shells. Thus the major area of the flanges 30 are free to stretch inwards when pressure is applied, thereby minimising the web of sealant which otherwise would form at the mould parting line.

The pressure is maintained in the cavities 21 and end seal 20 until the sealant has set to a stage where it will withstand the gas pressure in the pipelines. The encapsulation mould is then removed for re-use on other joints.

In the embodiment of the invention shown in FIG. 4 the end seals are removable so that alternative end seals can be fitted to accommodate smaller pipe diameters. The alternative smaller diameter seals comprise an outer member 31 with a U-section elastomeric seal 32 of appropriate internal diameter combined with two semi-circular plates 33 of inside radius only slightly greater than the outside radius of the pipeline adjacent the joint to be sealed, arranged to prevent the elastomeric seal 32 from deformation along the pipeline axis in either direction.

The advantages of using a method and apparatus described above rather than using conventional moulds which are expanded to a certain extent by the injection of sealant to maintain pressure of the sealant by virtue of strain energy in the mould material, are that by reducing the volume of the mould chamber to pressurize the sealant a saving in the amount of sealant used is achieved. Also a single mould can be used to seal different joint designs without using an excessive volume of sealant. Furthermore, leakage from the mould chamber does not reduce the pressure of the sealant as with the use of conventional moulds hitherto, since a constant pressure is applied to the flexible lining 19 during hardening of the sealant. The inflatable seals which are releasable from the mould allow a single mould to be used for a range of pipe diameters merely by changing the seals, again without an excessive amount of sealant being used. Leakage from the inflatable seal is less likely than with seals on conventional moulds especially when undersize or badly pitted pipes are encountered.

I claim:

1. Apparatus for sealing a leaking joint in a pipeline, which apparatus comprises a separable mould which can be located around, and sealed to, a pipeline, which mould comprises a flexible inner lining which in use defines in conjunction with the pipeline a mould chamber enclosing the joint, an outer rigid casing which in use surrounds and is sealingly connected to the lining to provide a space therebetween, means to allow sealant under pressure to be injected into the mould chamber and means for connecting the space between the lining and the casing to a source of fluid pressure.

2. Apparatus as claimed in claim 1 wherein the lining comprises two frusto-conical portions having their larger diameter ends in abutment with one another, both axial ends of each of said portions being secured with respect to the casing.

3. Apparatus as claimed in claim 1 wherein sealing means are provided on the mould to seal the mould to a pipeline, one sealing means on each side of a joint in the pipeline.

4. Apparatus as claimed in claim 3 wherein the sealing means comprise resilient sealing members located with respect to respective parts of the separable mould at locations one on each side of the mould chamber which members co-operate when the mould parts are fitted together, to provide sealing rings one on each side of the mould chamber.

5. Apparatus as claimed in claim 4 wherein the sealing members are U-shaped in cross-section with flanges provided by the limbs of the U-shaped cross-section projecting radially outwardly from the base of the U-shaped cross-section, a rigid element being located between the free ends of the limbs of each member to define a space between the sealing member and the rigid element, and means being provided to connect that space to a source of fluid pressure.

6. Apparatus as claimed in claim 5 wherein means are provided for restraining the sealing rings from axial deformation when subjected to fluid pressure.

7. Apparatus as claimed in claim 6 wherein said restraining means comprise arcuate plates which are made of a material substantially more rigid than that of the sealing members and are located one on each side of a sealing member.

8. Apparatus as claimed in claim 3 wherein the sealing means are releasably secured to the mould so that they can be removed and replaced by further scaling means.

* * * * *